United States Patent [19]

Chadwick

[11] Patent Number: 4,571,711
[45] Date of Patent: Feb. 18, 1986

[54] SONAR APPARATUS

[75] Inventor: Victor J. Chadwick, Dorset, England

[73] Assignee: Plessey Overseas Limited, Ilford, England

[21] Appl. No.: 457,264

[22] Filed: Jan. 11, 1983

Related U.S. Application Data

[63] Continuation-in-part of Ser. No. 237,659, Feb. 24, 1981, abandoned.

[30] Foreign Application Priority Data

Feb. 26, 1980 [GB] United Kingdom ............... 8006416

[51] Int. Cl.⁴ .............................................. G01S 7/52
[52] U.S. Cl. ..................................... 367/88; 367/106; 367/151
[58] Field of Search .................... 367/106, 12, 88, 130, 367/151

[56] References Cited

U.S. PATENT DOCUMENTS 3,757,286  9/1973  Richard ............................... 367/106

Primary Examiner—Richard A. Farley
Attorney, Agent, or Firm—Fleit, Jacobson, Cohn & Price

[57] ABSTRACT

A sonar survey apparatus comprises a submersible vessel having a structure adapted to receive a towing cable. A sonar signal transmitter is mounted on the structure. At least one acoustic reflector is mounted on the structure and is shaped to produce, in a focussing plane, line foci of acoustic echo signals received from remote positions. A line array of receiver transducers are mounted on the structure in the focussing plane and extend in a line substantially at right angles to the line foci. Each receiver transducer element has an output for providing a signal representative of a focussed echo signal. A selector is coupled with the output of each of the receiver transducer elements and has a control input and an output. The selector is operable in response to the control signal to select the output of a receiver transducer element, relating to a predetermined direction, for display. A sensor is mounted on the body for detecting movement of the vessel relative to a predetermined orientation and for providing a control signal for the selector. Selection of a different receiver transducer element is thereby effected so that the selector means continues to provide an output relating to the predetermined direction.

17 Claims, 10 Drawing Figures

SONAR APPARATUS

RELATED U.S. APPLICATION DATA

This application is a continuation-in-part of Ser. No. 237,659, filed Feb. 24, 1981, now abandoned.

BACKGROUND OF THE INVENTION

This invention relates to sonar apparatus.

For many sonar applications it is desirable that sonar transducers should be positioned between the sea bed and a surface vessel carrying out a sonar survey. This is normally achieved by means of a sonar transducer transmitter/receiver array which is carried by an underwater vessel towed by the surface vessel carrying out the survey. Sonar transducers of this kind are usually described as towed arrays or towed bodies and comprise a number of transducer elements, signals from which are conveyed to the surface vessel via a towing cable. A relatively large number of elements are normally used to form the array whereby beam forming utilising signal processing techniques is facilitated.

It will be appreciated that such techniques require a large number of electrical conductors to convey signals relating to each transducer element to the surface vessel or alternatively a complex multiplexing of the signals from the elements is required prior to transmission to the surface vessel. In addition complex processing techniques are required to resolve the received signals With sonar systems as previously described considerable difficulty in resolving the received signals occurs if there is displacement of the towed vessel or body other than in the towing direction e.g. as a result of partial rolling movement or as a result of yaw. Attempts have been made to reduce such movements of the towed vessel by way of aerodynamic shaping or steering but with only limited effect. In addition attempts have been made to compensate for such movement by sensing displacement of the towed vessel from a required orientation and by compensating the processed signals in response thereto. This again requires complex processing and requires further information to be relayed to the surface vessel for processing.

SUMMARY OF THE INVENTION

The present invention seeks to provide a relatively simple sonar survey apparatus in which beam forming is carried out in the water and in which at least some of the before mentioned problems of known arrangements are overcome.

According to the invention there is provided a sonar survey apparatus comprising a submersible vessel having a structure adapted to receive a towing cable, a sonar signal transmitter transducer means mounted on the structure, at least one acoustic reflector mounted on the structure and shaped to produce, in a focussing plane, line foci of acoustic echo signals received from remote positions, a line array of receiver transducer elements mounted on the structure in the focussing plane and extending in line substantially at right angles to the line foci, each receiver transducer element having an output for providing a signal representative of a focussed echo signal, selector means coupled with the output of each of the receiver transducer elements, the selector means having a control input and an output and being operable in response to a control signal to select the output of a receiver transducer element, relating to a predetermined direction, for display and sensing means mounted on the body for detecting movement of the vessel relative to a predetermined orientation and for providing a control signal for the selector means whereby selection of a different receiver transducer element is effected so that the selector means continues to provide an output relating to said predetermined direction. The selector means is preferably mounted on the structure and its output is then available for routing to the surface via a cable for display. Alternatively the selector means may be separate from the submersible vessel to permit mounting in a surface vessel and interconnection of the outputs of each of the receiver transducer elements and the sensing means via a cable.

The acoustic reflector is preferably mounted so as to produce line foci which are substantially vertical when the vessel is in towing disposition. In this form the signal produced by each receiver transducer element is less sensitive to partial rolling movements of the vessel as the elements stay within the limits of the line focus. In addition yaw of the vessel is compensated for by selector means in response to the sensing means.

In one advantageous version of the invention the vessel is adapted to carry out a sonar survey in a plurality of directions and includes for each additional direction a sonar signal transmitter transducer means mounted on the structure, at least one acoustic reflector mounted on the structure and shaped to produce, in a focussing plane, line foci of acoustic echo signals received from remote positions, a line array of receiver transducer elements mounted on the structure in the focussing plane and extending in line substantially at right angles to the line foci, each receiver transducer element having an output for providing a signal representative of a focussed echo signal, selector means coupled with the output of each of the receiver transducer elements, the selector means having a control input and an output and being operable in response to the control signal from the sensing means to select the output of a receiver transducer element, relating to a predetermined direction, for display.

The receiver transducer elements may be elongate and may be disposed parallel with the line foci.

The or each acoustic reflector may be curved in one plane to produce the line foci and may comprise part of a cylinder or be of parabolic form, or other conic sections capable of forming a line focus as required.

In a refinement of the invention there is provided for each line array of receiver transducer elements an additional line of receiver transducer elements mounted on the structure adjacent and mutually staggered relative thereto, which additional transducer elements are coupled with the selector means. This array disposition affords by means of selecting the appropriate transducer element a means of making finer corrections for yaw motion of the towed vessel as previously described.

The previously mentioned acoustic reflector(s) may comprise a first reflector mounted on the structure for reflecting acoustic energy received from a remote position and a second reflector mounted on the structure so as to receive acoustic energy from the first reflector and reflect it onto said focussing plane.

The structure may comprise an elongate body and a reflector of said at least one acoustic reflectors disposed on an elongate side of the body. In this case the structure may comprise a strut connected to one elongated side of the body and arranged to support the array of receiver transducer elements.

Alternatively the structure may comprise an elongate body with a reflector of each of a pair of said at least one acoustic reflectors disposed on opposite elongate sides of the body. In this case the structure may comprise a pair of struts connected to opposite elongate sides of the body and each arranged to support a different one of the arrays of receiver transducer elements.

Where additional survey directions are required then there may be provided for each said additional direction a separate transmitter transducer element mounted on the structure and arranged to transmit acoustic energy in the direction to be surveyed by that array.

A watertight compartment may be provided in the vessel and the selector means may be located therein together with transmitter transducer drive means and associated electrical circuity.

The struts and/or the body may be faired or streamlined so as to minimise drag when the vessel is towed.

BRIEF DESCRIPTION OF THE DRAWINGS

Some embodiments of the invention will now be described by way of example with reference to the accompanying drawings in which.

DESCRIPTION OF THE PREFERRED EMBODIMENTS

Figure 1:
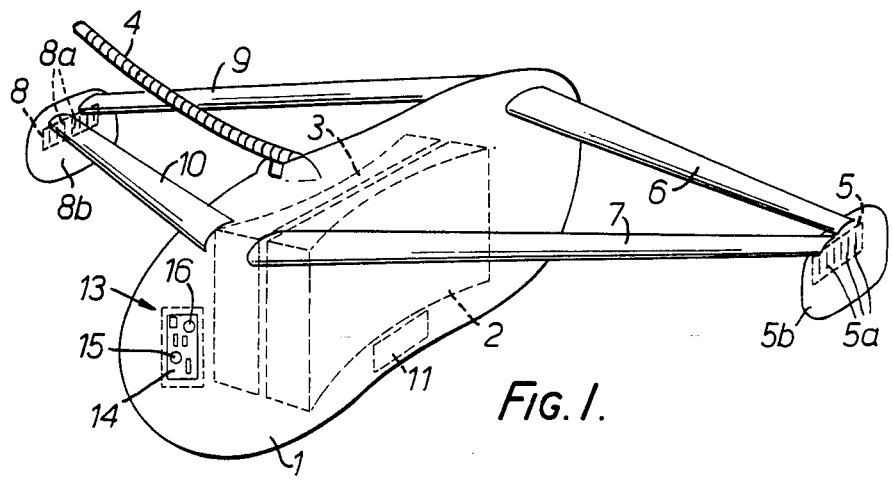
FIG. 1 is a generally perspective view of a submersible sonar survey vessel providing an apparatus constructed in accordance with the invention.

Referring now to the drawings, wherein corresponding parts of the various Figures bear the same numerical designations, the vessel comprises a faired body 1 constructed of a bronze alloy or any other suitable material which is preferably non-corrosive and which facilitates acoustic signal reflection. The body 1 is shaped to define on each side thereof a pair of acoustic relectors 2 and 3 and is adapted to receive a towing cable 4 which also accommodates electrical wires for carrying signals to or from transducers carried in or operatively associated with the body 1. The acoustic reflectors 2 and 3 are curved in one plane only as shown in the drawings to produce vertical line foci of acoustic energy received from distant points. Preferably, an acoustic absorbing material is provided behind and between the mirrors to reduce acoustic signals passing through the mirrors and being received on the wrong side.

Figure 2:
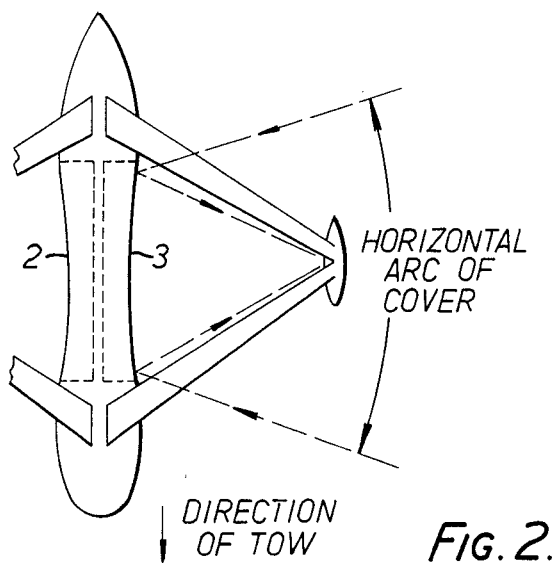
FIG. 2 is a part plan view of the vessel of FIG. 1.
Figure 3:
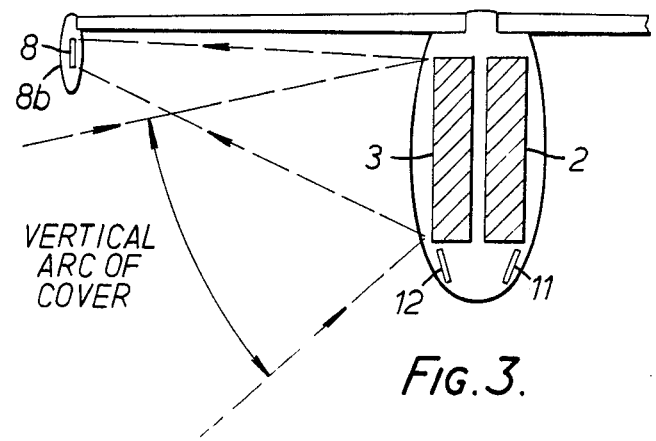
FIG. 3 is a part sectional view of the vessel shown in FIGS. 1 and 2.

A line array 5 of receiver transducer elements 5a are carried by a pair of struts 6, 7 and support pad 5b. The line array extends substantially horizontally in the focussing plane of the reflector 2 such that a central transducer in the line array is disposed on the principal focal line of the reflector whilst the line array extends substantially at right angles to the focal line. This can be seen in greater detail in FIG. 5. As illustrated the transducers 5a are of elongate form and are arranged to extend parallel to the line foci. However, the transducers need not be of elongate form. A similar arrangement is provided on the opposite side of the body 1 and is formed by the line array 8 of receiver transducer elements 8a carried by a pair of struts 9, 10 and supporting pad 8b. Again a central transducer in the line array is disposed on the principal focal line of the reflector. Two transmitting transducers 11 and 12 are provided, which are positioned to radiate energy one on each side of the body 1. In order to reduce drag when the vessel is towed, the struts 6, 7, 9 and 10 and the body 1 are streamlined and supporting pads 5b and 8b, on which the line arrays 5 and 8 respectively are mounted, are also streamlined as shown in FIGS. 1, 2 and 3. Signals received by the transducers 5 and 8 may be transmitted, along wires concealed in the struts, to the front of the body which includes space for buoyancy chambers and a watertight compartment 13 containing apparatus 14 for processing signals received by the receiver transducer arrays 5 and 6 and for providing signals for the transmitter transducers 11 and 12. The apparatus 14 includes a transducer selector 15 and a sensor 16 for detecting variation of orientation of the body in the water and for providing a control signal in dependence upon the orientation of the vessel. Such devices are well known in navigational applications and a gyroscopic inertial navigation transducer arranged to provide a voltage indicative of yaw is particularly suitable for this application. A block schematic diagram of the electrical connections is given in FIG. 6. The selector 15 is effective to route the signal relating to one of the transducers to the output for routing via a cable to the surface, in dependence upon the control signal from the sensor 16. Thus in this preferred embodiment, the cable may be arranged to carry a minimum number of signals and may therefore be reduced in size so as to minimise drag.

Figure 5:
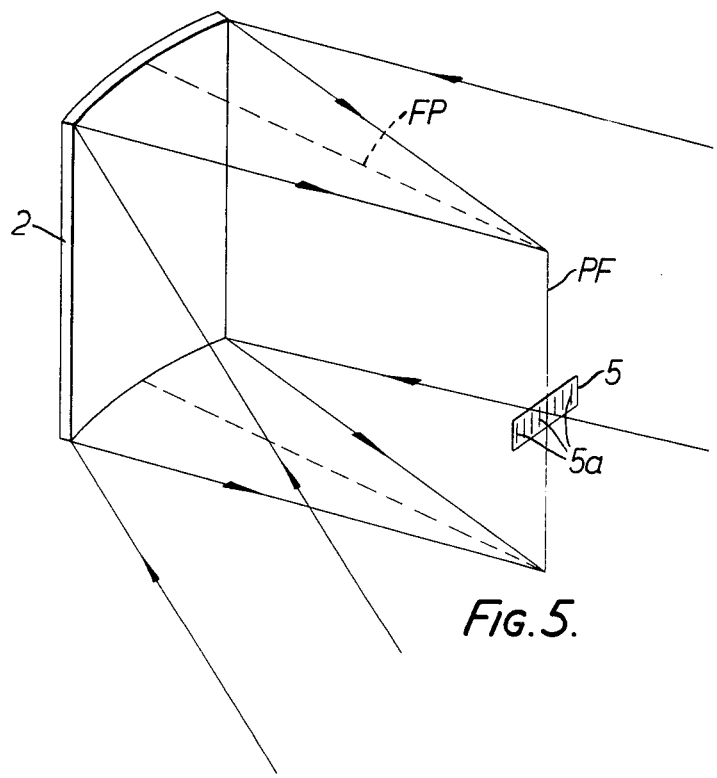
FIG. 5 is a ray diagram appertaining to the reception of received echo signals in the apparatus of FIGS. 1 to 3.
Figure 6:
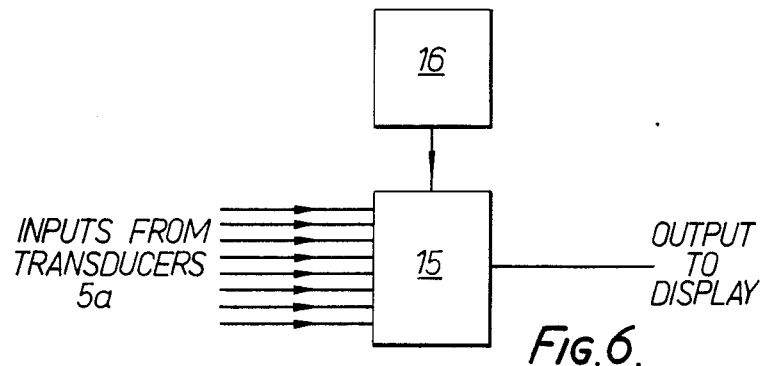
FIG. 6 is a block schematic diagram showing the interconnection of functional devices employed in the apparatus of FIGS. 1 to 4.

Referring now to FIG. 5 a "ray" diagram shows the effect of receipt of an echo from a remote position somewhere along the principal focal plane FP of the reflector. An acoustic echo approaching the reflector from this direction will be reflected and focussed at the principle focus PF as a vertical line incident on the central transducer of the array. In view of this line focus a partial rolling movement of the vessel results in displacement of the focussed image but within limits it will still strike the transducer and provide information necessary for processing.

Figure 7:
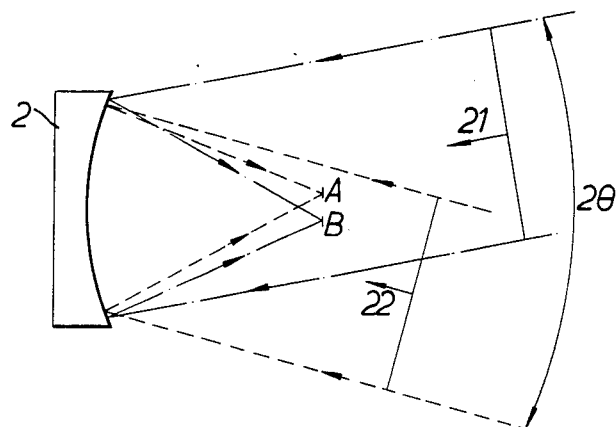
FIG. 7 is a schematic plan view illustrating the focussing effect of the reflectors on wave fronts received from different directions.

FIG. 7 shows in plan view the focussing effect of the reflector 2. A plane wavefront 21 from a distant object provides a ray path illustrated by dot/dash lines and provides a line focus at a transducer B. Similarly, a plane wavefront 22 from another distant object provides a ray path illustrated by dash lines and provides a line focus at transducer A. Angle $2\theta$ corresponds to the horizontal arc of cover shown in FIG. 2. When a yawing motion of the vessel occurs then the same acoustic echo signal appears to come from a different position relative to the reflector and accordingly is brought to a focus at a different position along the line array of receive transducer elements and accordingly is focussed on a different one of the transducers. This divertion from the intended orientation is sensed by the sensor 16 and used to control the selector 15 to select the transducer on which focussing now occurs.

Figure 8:
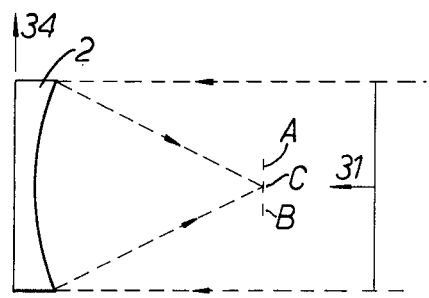
FIGS. 8, 9 and 10 are schematic illustrations to illustrate the effect of change of orientation of the survey vessel in the water.
Figure 9:
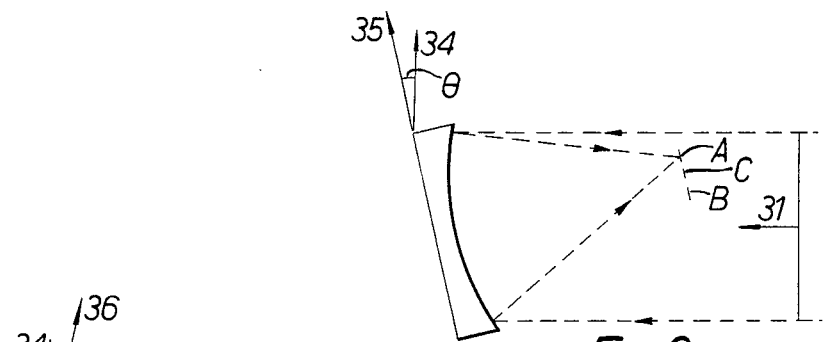
Figure 10:
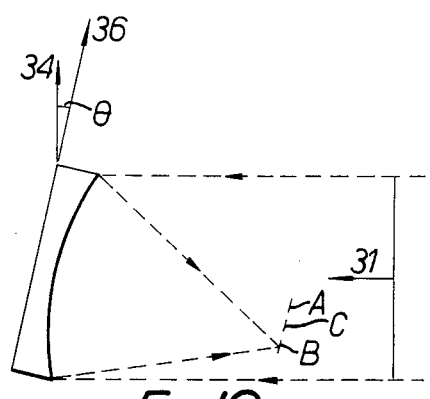

The effect of yaw is better illustrated by the schematic diagrams of FIGS. 8, 9 and 10 and the same reference characters have been used throughout to identify the same features. FIG. 8 shows the normal operation when the vessel is in straight line towing disposition in the water. A plane wavefront 31 from an object in the required constant look direction provides a ray path illustrated by dash lines. To simplify illustration only three transducers are shown to represent extreme elements A and B of the line array and C at the centre. More transducers could be included in the line. The arrow 34 shows the required direction of motion of the towed body in order to receive on transducer C an image from the desired direction corresponding to wavefront 31. In this case the signal from transducer C would be selected to provide a receive signal.

FIG. 9 illustrates correction for extreme yaw to port. The direction of the towed body is indicated by arrow 35 and is at angle $\theta$ to the required towing direction 34. The reflector now focuses signals from the wavefront 31 onto transducer A and this transducer is selected to provide a receive signal. Angle $\theta$ is the extreme yaw angle for which correction can be made and $2\theta$ corresponds to the horizontal arc of cover angle of FIGS. 2 and 7.

FIG. 10 illustrates correction of extreme yaw to starboard. The direction of the towed body is indicated by arrow 36 and is at an angle $\theta$ to the required towing direction 34. The reflector now focusses signals from the wavefront 31 onto transducer B and this transducer is selected to provide a receive signal.

It will be appreciated that with a line array comprising more than three transducers, intermediate angles of yaw are compensated by suitable selection of intermediate transducers in the receive array.

Although it is preferred for the selector 15 to be located in the vessel it will be appreciated that it could be located in a surface vessel and the signals from all of the transducers could be routed thereto by cables together with a control signal from the sensor 16. Such an arrangement whilst falling within the scope of this invention is less advantageous in that more conductive paths are required in the cable which will accordingly be of larger size and introduce more drag. In addition the drive signals for the transmitter transducers 11 and 12 can be generated in a surface vessel and relayed to the transmitter transducers via a cable.

It will also be appreciated that signals originating from targets positioned at 90° to the towing direction are normally focused on the centre of the receiving transducer array, but it may be arranged, by transducer element switching, for signals to be received from transducers positioned on one side or the other of the centre line, whereby some degree of beam steering is facilitated, so that yaw of the towed vessel may be compensated for.

Figure 4:
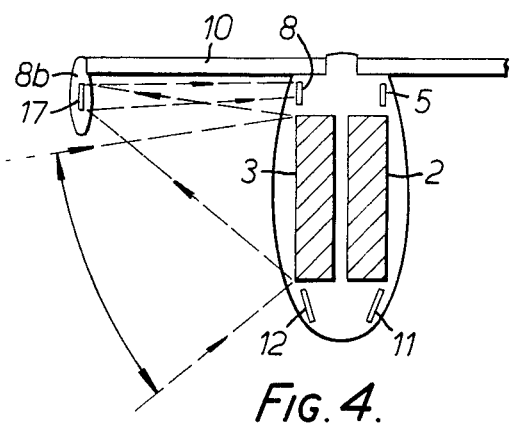
FIG. 4 is a part sectional view similar to FIG. 3 but employing an intermediate reflector between main reflector and transducer.

Each of the two reflectors may have associated with it an intermediate reflector via which acoustic energy is reflected onto its associated receiver transducer. Such an arrangement is shown in FIG. 4, one side only of the arrangement being illustrated. In this arrangement acoustic echo signals are reflected by the reflector 3 onto an intermediate reflector 15 which is carried by the supporting pad 8b. The intermediate reflector then focusses the received echo signals onto the transducer 8 which is positioned in the body above the reflector 3. In this way the length of the arms 10 can be reduced as the focussing path length is approximately twice the arm length. A further advantage of this arrangement is that all of the electrical connections are inside the body and there is no need to route leads along the arms 9 or 10.

Arrangements as just before described have the advantage that beam forming is produced in the water by acoustic reflection techniques rather than by complex signal processing and a system is thereby afforded which generates a greater signal level at the receive transducer. This reduces the electronics amplification required of the received signal in electrical form and hence improves the signal to noise ratio for a beam output.

Although the embodiment described employs the reflectors disposed so as to provide a substantially vertical line focus and the line array of transducers disposed horizontally as is preferred for most applications, different relative orientations are possible. One possibility is for the reflector to be arranged to produce a horizontal line focus and the line array of transducers to be disposed vertically. In such an arrangement yaw will be of minor significance in view of resultant displacement of the transducer along the line focus whilst in this case roll of the vessel will be compensated by the selection of an appropriate transducer in response to a sensing of rolling movement relative to a required disposition. Such an arrangement is considered to fall within the scope of this invention.

Any reflector capable of producing a line focus may be employed e.g., a cylindrical, parabolic or eliptical reflector.

It will be understood that the above description of the present invention is susceptible to various modifications, changes and adaptations.

I claim:

1. A sonar survey apparatus comprising a submersible vessel having a structure adapted to receive a towing cable, a sonar signal transmitter transducer means mounted on the structure, at least one acoustic reflector mounted on the structure and shaped to produce, in a focussing plane, line foci of acoustic echo signals received from remote positions, a line array of receiver transducer elements mounted on the structure in the focussing plane and extending in line substantially at right angles to the line foci, each receiver transducer element having an output for providing a signal representative of a focussed echo signal, selector means coupled with the output of each of the receiver transducer elements, the selector means having a control input and an output and being operable in response to a control signal to select the output of a receiver transducer element, relating to a predetermined direction, for display and sensing means mounted on the body for detecting movement of the vessel relative to a predetermined orientation and for providing a control signal for the selector means whereby selection of a different receiver transducer element is effected so that the selector means continues to provide an output relating to said predetermined direction.

2. An apparatus as claimed in claim 1, wherein the acoustic reflector is mounted so as to produce line foci which are substantially vertical when the vessel is in towing disposition.

3. An apparatus as claimed in claim 1 adapted to carry out a sonar survey in a plurality of directions and including for each additional direction a sonar signal transmitter transducer means mounted on the structure, at least one acoustic reflector mounted on the structure and shaped to produce, in a focussing plane, line foci of acoustic echo signals received from remote positions, a line array of receiver transducer elements mounted on the structure in the focussing plane and extending in line substantially at right angles to the line foci, each receiver transducer element having an output for providing a signal representative of a focussed echo signal, selector means coupled with the output of each of the receiver transducer elements, the selector means having a control input and an output and being operable in response to the control signal from the sensing means to select the output of a receiver transducer element, relating to a predetermined direction, for display.

4. An apparatus as claimed in claim 1, wherein the selector means is mounted on the structure and its output is available for routing to the surface via a cable for display.

5. An apparatus as claimed in claim 1, wherein the selector means is separate from the submersible vessel to permit mounting in a surface vessel and interconnection of the outputs of each of the receiver transducer elements and the sensing means is via a cable.

6. An apparatus as claimed in claim 1, wherein the receiver transducer elements are elongate.

7. An apparatus as claimed in claim 1, wherein the acoustic reflector(s) is/are curved in one plane to produce the line foci.

8. An apparatus as claimed in claim 7, wherein the reflector(s) comprise part of a cylinder.

9. An apparatus as claimed in claim 7, wherein the reflector(s) is/are of parabolic form.

10. An apparatus as claimed in claim 1, comprising for each line array of receiver transducer elements an additional line of receiver transducer elements mounted on the structure adjacent and mutually staggered relative thereto, which additional transducer elements are coupled with the selector means.

11. An apparatus as claimed in claim 1, wherein said at least one acoustic reflector comprises a first reflector mounted on the structure for reflecting acoustic energy received from a remote position and a second reflector mounted on the structure so as to receive acoustic energy from the first reflector and reflect it onto said focussing plane.

12. An apparatus as claimed in claim 1 wherein said structure comprises an elongate body and a reflector of said at least one acoustic reflectors is disposed on an elongate side of the body.

13. An apparatus as claimed in claim 3, wherein said structure comprises an elongate body at least one acoustic reflector is disposed on opposite elongate sides of the body.

14. An apparatus as claimed in claim 12, wherein the structure comprises a strut connected to one elongate side of the body and arranged to support the array of receiver transducer elements.

15. An apparatus as claimed in claim 13, wherein said structure comprises a pair of struts connected to opposite elongate sides of the body and each arranged to support a different one of the arrays of receiver transducer elements.

16. An apparatus as claimed in claim 3, including for each said additional direction a separate transmitter transducer element mounted on the structure and arranged to transmit acoustic energy in the direction to be surveyed by that array.

17. An apparatus as claimed in claim 1, wherein a watertight compartment is provided in the vessel and the selector means is located therein together with transmitter transducer drive means and associated electrical circuity.

* * * * *